US007517571B2

(12) United States Patent
Funke et al.

(10) Patent No.: US 7,517,571 B2

(45) Date of Patent: Apr. 14, 2009

(54) TEMPORARY TATTOO FOR NEUTRALIZING OR BLOCKING SKIN IMPERFECTIONS

(76) Inventors: Barbara Funke, 18322 Blue Haren Dr. W., Northville, MI (US) 48167; Roxanne Donatiello, 324 1St. St., Northville, MI (US) 48167

( * ) Notice: Subject to any disclaimer, the term of this patent is extended or adjusted under 35 U.S.C. 154(b) by 614 days.

(21) Appl. No.: 10/908,416

(22) Filed: May 11, 2005

(65) Prior Publication Data

US 2005/0255300 A1 Nov. 17, 2005

Related U.S. Application Data

(60) Provisional application No. 60/570,319, filed on May 12, 2004.

(51) Int. Cl.
*B32B 9/00* (2006.01)

(52) U.S. Cl. ................... 428/40.1; 428/195.1; 428/201; 428/41.6; 428/42.1

(58) Field of Classification Search ............. 428/195.1, 428/40, 201, 41.6, 42.1, 40.1
See application file for complete search history.

(56) References Cited

U.S. PATENT DOCUMENTS

| | | | | |
|---|---|---|---|---|
| 4,161,176 | A | | 7/1979 | Harris, II et al. |
| 4,594,276 | A | | 6/1986 | Relyea |
| 4,623,593 | A | | 11/1986 | Baier et al. |
| 4,783,350 | A | | 11/1988 | DeMatteo et al. |
| 4,848,373 | A | | 7/1989 | Lenkey |
| 5,120,325 | A | | 6/1992 | Dow, Jr. |
| 5,217,455 | A | | 6/1993 | Tan |
| 5,450,790 | A | | 9/1995 | PeQueen et al. |
| 5,586,971 | A | | 12/1996 | Newman |
| 5,617,586 | A | | 4/1997 | PeQueen et al. |
| 5,816,269 | A | | 10/1998 | Mohammed |
| 5,817,385 | A | | 10/1998 | Stanislav |
| 5,833,649 | A | | 11/1998 | Atef |
| 5,871,754 | A | | 2/1999 | Briggs et al. |
| 5,928,797 | A | * | 7/1999 | Vineberg .................... 401/132 |
| 5,942,065 | A | * | 8/1999 | Biggs et al. ................... 156/90 |
| 6,074,721 | A | * | 6/2000 | Moore et al. ............... 428/42.1 |
| 6,149,204 | A | * | 11/2000 | Casper ........................ 283/81 |
| 6,207,874 | B1 | | 3/2001 | Felton et al. |
| 6,264,786 | B1 | * | 7/2001 | Cromett ...................... 156/289 |
| 2002/0110672 | A1 | * | 8/2002 | Muratore-Pallatino et al. ... 428/195 |

FOREIGN PATENT DOCUMENTS

| | | |
|---|---|---|
| GB | 1215007 | 3/1967 |
| GB | 1248731 | 8/1967 |
| GB | 1331774 | 10/1969 |
| GB | 1449883 | 8/1973 |
| GB | 2116074 | 2/1982 |

* cited by examiner

*Primary Examiner*—D. Lawrence Tarazano
*Assistant Examiner*—Tamra L Dicus
(74) *Attorney, Agent, or Firm*—Dickinson Wright PLLC

(57) ABSTRACT

A temporary tattoo for concealing and for blocking a permanent tattoo or other imperfections on an individual's skin includes a white opaque neutralizer base that effectively prevents read through of the underlying marking. The temporary tattoo includes at least one pigmented layer disposed on top of the white opaque neutralized base that is intended to meter the individual's skin tone and/or pigment. The temporary tattoo also includes one or more reintroduction layers disposed between the neutralized base and the at least are pigmented layer.

16 Claims, 3 Drawing Sheets

TEMPORARY TATTOO FOR NEUTRALIZING OR BLOCKING SKIN IMPERFECTIONS

CROSS REFERENCE TO RELATED APPLICATIONS

The present invention claims priority from U.S. Provisional Application Ser. No. 60/570,319, entitled "Method and Device for Neutralizing or Blocking Skin Imperfections," which was filed on May 12, 2004.

TECHNICAL FIELD

The present invention relates generally to a temporary covering device for application to an individual's skin. More particularly, the present invention relates to a temporary tattoo for an effective application to an individual's skin that can block or hide existing tattoos or skin imperfections.

BACKGROUND OF THE INVENTION

A tattoo is a design on the skin that can be either permanent or non-permanent. Permanent tattoos are well known and have their origins dating back to at least as early as the Egyptian times. Permanent tattoos are typically applied to the skin with tattoo needles, which ink a desired design onto an individual's skin. Non-permanent tattoos are also known, and are typically adhered to an individual's skin in a variety of known fashions. Tattoos have been applied to an individual's skin for a variety of different purposes, including decoration, social status, and as a sign of endearment.

While permanent tattoos have been around for thousands of years, the desire to remove or cover permanent tattoos has likely existed almost as long. The same desire that exists to remove or cover permanent tattoos also applies to scars or skin imperfections that may exist on an individual's skin. Typical processes for removing permanent tattoos or correcting or hiding scars or skin imperfections include painful and expensive surgical procedures that can result in scarring or skin tissue. Less permanent methods involve the application of make-up or other liquid concealers. The known make-up products that are used as temporary concealers suffer from a variety of disadvantages. For example, they are susceptible to smearing or smudging are not waterproof and therefore last only a relatively short period of time. Further, they require frequent reapplication to ensure that the individual's skin remains covered.

Additionally, some temporary tattoos are known to be utilized to cover up dark skin imperfections. However, these temporary tattoos have only limited effectiveness. For example, if these temporary tattoos are applied over a darker skin imperfection, the underlying skin imperfection will typically show through the temporary tattoo, which defeats the purpose of attempting to cover or hide it. In general, these current temporary tattoos include three discrete layers. The first layer is a temporary tattoo paint or design that is applied to paper. The second layer consists of a sticky substrate that is disposed on top of the tattoo paint or painted design to allow the above layer to adhere to the skin. The third layer consists of a clear plastic removable protective cover which is intended to protect the temporary tattoo patch.

An exemplary illustration of a prior method for covering a skin imperfection is disclosed in U.S. Publication No. 2002/01110672, to Muratore-Pallatino. The Muratore-Pallatino reference discloses a temporary tattoo for concealing veins, blemishes, wine marks, bruises, age marks and other skin conditions. The temporary tattoo disclosed therein consists of a transfer patch that is intended to match the skin tone and pigment holding an image of human skin. Thus, these temporary tattoos vary in tones in an effort to closely match and blend in with a variety of skin pigments and colorings. These temporary tattoos may also vary in size and shape to cover a particular skin imperfection. The temporary tattoo disclosed in Muratore-Pattatino consists of an opaque tattoo patch holding an image of human skin applied to translucent material, which is applied to conceal skin imperfections. While this temporary tattoo may work reasonably well on many skin imperfections it is ineffective in concealing a permanent tattoo therebeneath. This is because an undertone of color from the permanent (or other temporary) tattoo will typically show through the temporary tattoo containing the image of the human skin. The same problem also applies with the application of this temporary tattoo to any high contrast or dark color skin imperfections. The end result is that despite the application of the opaque temporary tattoo, the permanent tattoo or skin imperfection is not completely concealed.

Other processes exist, however, they all also suffer from a variety of disadvantages. For example, some of the processes are expensive and therefore not readily available. Other processes do not adequately conceal dark skin imperfections or the ink from a permanent tattoo. Thus, a need exists for a temporary concealer for application to an individual's skin that will adequately hide all types of skin imperfections as well as permanent tattoos that is readily available, can be easily applied, and is relatively long lasting.

SUMMARY OF THE INVENTION

It is therefore an advantage of the present invention to provide a temporary tattoo for more efficiently concealing a permanent tattoo or other skin imperfection.

It is another advantage of the present invention to provide a temporary tattoo for concealing a permanent tattoo or other skin imperfection that prevents or blocks any "read through" of the underlying skin markings.

It is yet another advantage of the present invention to provide a temporary tattoo for concealing a permanent tattoo or other skin imperfection that consists of a patch to be applied to the skin.

It is still another advantage of the present invention to provide a temporary tattoo for concealing a permanent tattoo or other skin imperfection that consists of a paint/liquid to be applied to the skin.

It is still a further advantage of the present invention to provide a temporary tattoo for concealing a permanent tattoo or other skin imperfection that consists of a paste to be applied to the skin.

It is yet a further advantage of the present invention to provide a temporary tattoo for concealing a permanent tattoo or other skin imperfection that is waterproof.

It is still yet a further advantage of the present invention to provide a temporary tattoo for concealing a permanent tattoo or skin imperfection that is easy to apply and pain free.

In accordance with the above and other advantages of the present invention, a temporary tattoo for concealing and/or blocking a permanent tattoo or other skin imperfection is provided. The temporary tattoo employs a white opaque neutralizer base that more effectively conceals permanent tattoos or dark skin imperfections. The white opaque neutralizer base is applied to an individual's skin. The temporary tattoo includes at least one pigmented layer disposed on top of the white opaque neutralizer base to better match an individual's skin tone and/or pigment. Additionally, one or more layers that re-introduce pigment may be disposed between the neutralizer base and the top pigmented layer to provide a more natural look.

In accordance with the above and other advantages of the present invention, a method for concealing permanent tattoos or other skin imperfections is provided. The method includes applying a white opaque neutralizer base to an individual's skin over a permanent tattoo or skin imperfection, which the individual wishes to conceal. Thereafter, a pigment layer is applied over the base layer to match the individual's skin tone.

These and other features and advantages of the present invention will become apparent from the following description of the invention, when viewed in accordance with the accompanying drawings and appended claims.

DETAILED DESCRIPTION OF THE PREFERRED EMBODIMENT(S)

Figure 1:
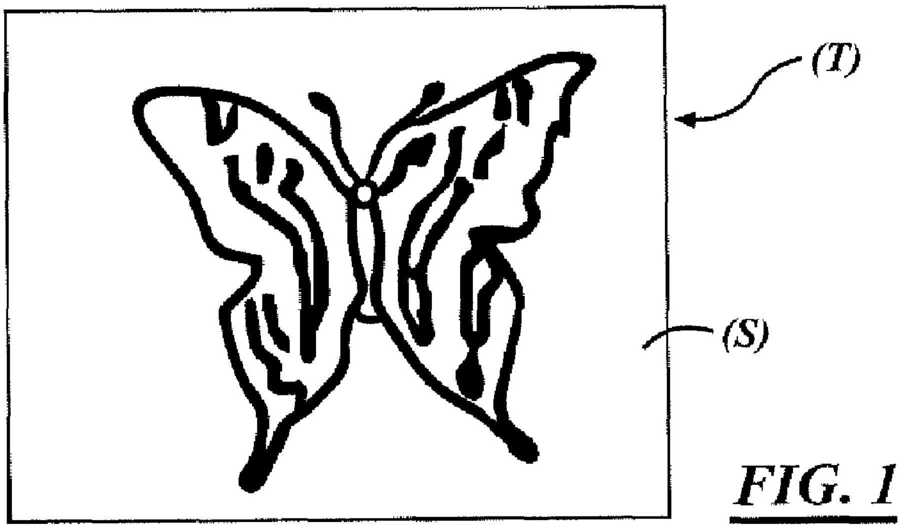
FIG. 1 is a plan view of a permanent tattoo (T) etched on the skin (S) of an individual, which is to be covered in accordance with one embodiment of the present invention.

The present invention discloses various embodiments of a temporary tattoo for covering and hiding a permanent tattoo or skin imperfection. As is known, temporary tattoos can be utilized to cover up a skin blemish. An exemplary type of permanent tattoo (T), consisting of a butterfly tattoo, located on the skin (S) of an individual is illustrated in FIG. 1. The permanent tattoo (T) as shown includes black and other dark colors. However, it will be understood that any other permanent tattoos regardless of size, image, or color can be covered in accordance with the present invention. It will also be understood that the tattoo can consist of any combination of colors. Moreover the colors preferably result from ink as is well known. Because of the dark colors typically utilized in such permanent tattoos, they have proven very difficult to temporarily cover up, when desired.

In accordance with existing methods, skin imperfections are sometimes covered with a temporary tattoo having an image of skin with a color that matches the skin tone of the individual who seeks to cover their skin imperfection. However, when the temporary tattoo is positioned on top of the skin imperfection, the skin imperfection, while being fully covered, is not fully blocked and can still be observed through the temporary tattoo. This is, at least in part, because the temporary tattoo holding the image of skin does not sufficiently block the light reflecting from the dark skin imperfection. Thus, an observer can visually perceive the dark skin imperfection through the opaque temporary tattoo, a condition known as "read through." The dark skin imperfection most likely appears as a shaded or muted undertone to the temporary tattoo. In some instances, it is possible that the details of the dark skin imperfection will "read through" the temporary tattoo such that both the dark skin imperfection and the temporary tattoo can be perceived. For example, the dark skin imperfection can undesirably read through the skin colored opaque temporary tattoo of the known prior art and appears as a muted dark or gray tone. These drawbacks are overcome by the invention discussed below and shown in the attached drawings.

Referring now to FIGS. 2 through 5, which illustrates various embodiments of a temporary tattoo 10 that overcomes the above drawbacks. The disclosed temporary tattoo 10 is particularly usable on the skin of an individual for covering and concealing a permanent tattoo or other existing skin imperfection. The temporary tattoo 10 preferably consists of multiple layers or components. While the term layers is utilized, it will be understood that the layers can be combined or separated as desired and the temporary tattoo can be formed in a variety of different steps, as is discussed in more detail below. Moreover, the temporary tattoo 10 may consist of a variety of different shapes and sizes. The temporary tattoo may also be constructed in a multitude of color tones and pigments. Further, the preferred temporary tattoo is waterproof or water resistant such that it does not wear off in water. Additionally, the disclosed temporary tattoo has increased longevity over other covering methods.

In general, the temporary tattoo 10 includes a first base layer 12, a color layer 14, and an adhesive layer 16, which helps secure the temporary tattoo to the individual's skin. The temporary tattoo also includes a paper base 18 that overlies the color layer 14. As is discussed in more detail below, each of these layers can be applied individually or as multiple separate steps. Additionally, the temporary tattoo 10 and each of the layers can come in a variety of different sizes and shapes. Additionally, these sizes and shapes can be preformed or they can be produced in a sheet and cut down to size as desired.

The first layer 12 is preferably an opaque white neutralizer base. While the neutralizer base 12 is preferably white, other variations in the spectrum such as white, taupe or the like that providing blocking and prevent "read through" may be utilized. In one embodiment shown in FIG. 4, the opaque white neutralizer base consists of a patch or patches that is intended to be applied to an individual's skin to cover the area to be concealed, i.e. permanent tattoo or skin imperfection. Current printing process for producing temporary tattoo patches only apply a limited number of layers of color in a single run. It has been determined that the number of layers of a white neutralizer base applied under current processes may be insufficient to prevent "read through." Accordingly, in accordance with the present invention, the opaque neutralizer base must be sufficient to prevent or minimize "read through." Therefore, the patch may need to be run through the machine more than one time to have sufficient color on the patch to meet this requirement. In one exemplatory embodiment, six (6) layers of white opaque neutralizer base were sufficient to prevent "read through." Alternatively, instead of a patch, the white neutralizer base may consist of a liquid or a paste. Specifically, in the embodiment where the layers are applied separately, the neutralizer patch includes an adhesive layer 16 that allows the neutralizer patch to be secured to the skin.

Figure 2:
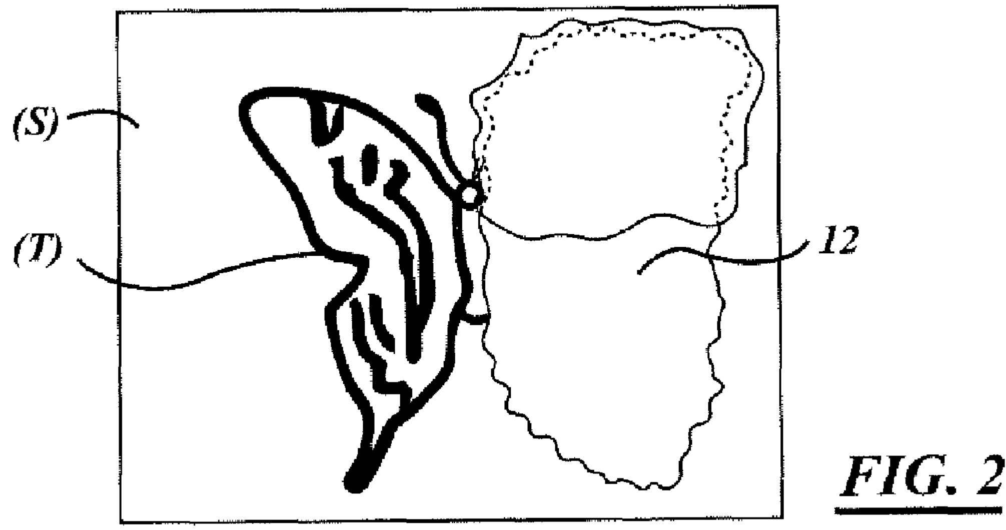
FIG. 2 is a partial plan view illustrating a permanent tattoo (T) on the skin (S) of an individual partially covered by a white opaque neutralizing base of a temporary tattoo in accordance with one embodiment of the present invention.

As shown schematically in FIG. 2, the first layer 12 consists of a white opaque neutralizer base is then applied to a portion of the permanent tattoo (T) of FIG. 1. While FIG. 2 illustrates the white opaque neutralizer base covering only a portion of the permanent tattoo (T) for illustration purposes only, it will be understood that the white opaque neutralizer is applied such that it covers the entire permanent tattoo (T) or skin imperfection as designed by an individual.

Additionally, the neutralizer patch may also include a clear protective covering with an imprinted grid 24. Alternatively, the imprinted grid may be printed on a separate grid sheet. For application purposes, the plastic protective covering is removed and separated from the opaque white neutralizer patch and then the plastic clear covering with the grid could be placed on the individual's skin imperfection or permanent tattoo enabling them to outline a customized template. Thereafter, the individual could replace the grid on top of the neutralizer patch and cut the patch to the proper size in order cover the skin imperfection to be neutralized or covered. This neutralizer patch is then directly applied over the permanent tattoo and/or skin imperfection. This could be used in any combination with the liquid temporary tattoo paint(s), as discussed below.

In one embodiment, the second or color layer 14, consists of a temporary tattoo patch that closely matches the individual's skin tone, which is applied on top of the neutralizing patch. This patch may be opaque and/or translucent. In this embodiment, where the layers are applied separately, the temporary tattoo patch includes an adhesive layer 26 that allows this patch to be secured to the skin on top of the neutralizer patch. Alternatively, the color layer 14 may consist of a dusting powder.

Figure 3:
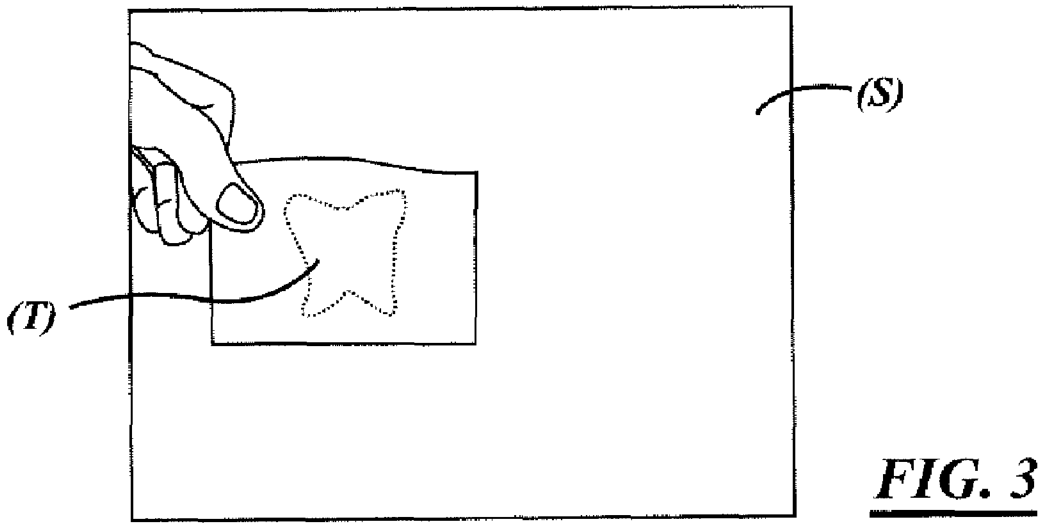
FIG. 3 is a partial plan view schematically illustrating the covering of the permanent tattoo (T) by a pigment or skin tone layer over a white opaque neutralizing base in accordance with one embodiment of the present invention.

As shown schematically in FIG. 3, after the white opaque neutralizer base is applied over the permanent tattoo (T), the color layer 14, which is intended to match the skin tone and/or pigment of an individual is applied thereover. Thus, the permanent tattoo (T), which is illustrated in phantom lines, is not visible and the color layer 14, which matches the individual's skin is visible. Further, because of the utilization of the white opaque neutralizer base, the permanent tattoo (T) will not "read through" the color layer 14.

The patch or temporary tattoo paint may also come with the previously mentioned removable clear protective covering with an imprinted grid or a separate grid sheet 28, as discussed above in connection with the first layer 12. Again, this allows the individual to create a customized template slightly larger than the previous layer(s). By placing this skin tone layer(s) on top and allowing the patch to slightly overlap onto the individual's skin, a more natural blending process occurs with that of the individual's skin. This temporary tattoo patch may be offered in varying skin tone(s) and/or pigments. This could be used in any combination with the liquid temporary tattoo paint(s), as discussed below, the dusting powder discussed above, or any other embodiment.

In one embodiment, in some applications the skin tone may need to be graduated back after applying the white opaque neutralizer base layer 12 and before application of the final color layer 14. This layer 30 may be either opaque or translucent. In a preferred embodiment, the graduation layer 30 consists of a temporary tattoo patch, which includes an adhesive layer 34 that allows it to be adhered to the skin. The temporary tattoo patch method again allows for the utilization of the above-mentioned customizing grid 32. The customized template should be cut such that the layer 30 overlies the white neutralizer base layer(s) 12. This pigmented layer 30 is then applied enabling the individual to use the final or top layer(s) 14 to blend more naturally with that of the individual's skin tone. This graduation layer 30 may be offered in varying skin tone(s) and/or pigments. This could be used in any combination with the temporary tattoo paint(s), the dusting powder, or any other white opaque neutralize base layer. This layer would allow the final layer to be applied and more accurately match an individual's skin.

It will be understood that some or all of the above steps may be combined as a single pre-assembled product, which requires only one application to an individual's skin. For example, the base neutralizer layer 12, possible mid introduction of pigment layer 30, and the top layer 14 may all be pre-assembled so that the individual simply selects the desired color and size to apply. Additionally for large permanent tattoos or skin imperfections, multiple patches may be aligned side by side or on top of one another to cover the entire discolored area. Alternatively, the process may utilize layering or temporary tattoo patches stacked on top of the other on the individual's skin or one patch placed on top of the individual's skin with multiple layers of color applied to the one patch. In the case of the one patch method, an overhang may be utilized on the top layer, such that the edges or borders of the lower layers are covered. The temporary tattoo may also be manufactured in multiple color layers.

Figure 5:
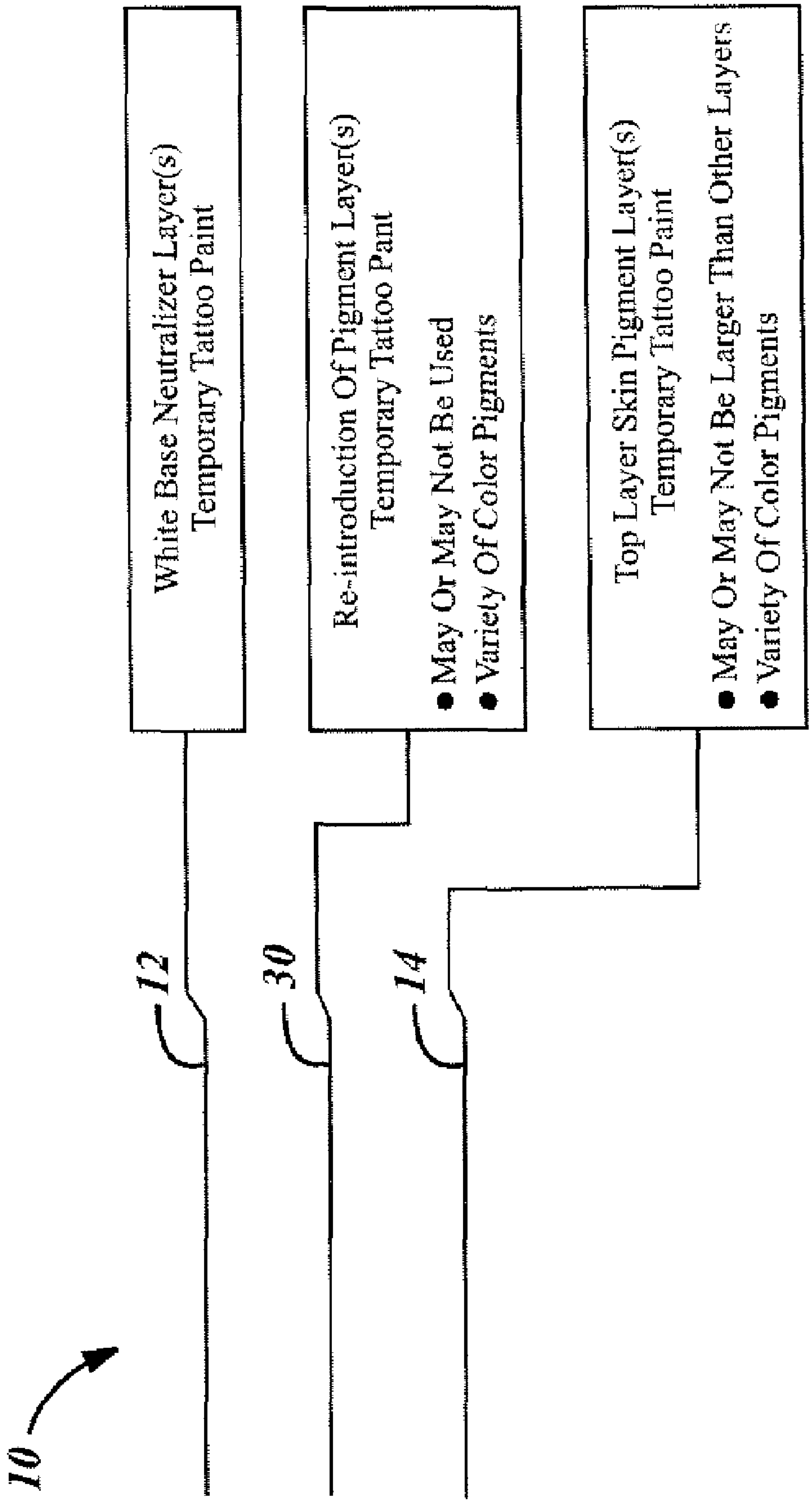
FIG. 5 is an example of a temporary tattoo patch in accordance with another embodiment of the present invention.

In another embodiment, as best shown in FIG. 5, the first layer 12 consists of a liquid having an opaque white temporary tattoo paint neutralizer base to cover the area to be concealed or blocked The application of the liquid temporary tattoo paint may be applied by utilizing any of a variety of suitable methods, including roller, brush, sponge, Blo-pen™, blotter, spray on, dauber, aerosol or other suitable methods. In this embodiment, a liquid temporary tattoo paint top layer 14 that closely matches the individual's skin is then applied as the top layer on top of the neutralizer layer 12. This paint may be opaque and/or translucent. The application of the liquid temporary tattoo paint may be applied by utilizing, but not limited to, any of the following methods: roller, sponge, dauber, brush, Blo-pen™, aerosol, blotter, sprayed on by means of the following: air brush, pump spray, aerosol, or other suitable application methods. This liquid temporary tattoo paint may be offered in varying skin tone(s) and/or pigments. The paint layers are preferably applied by spraying them on and are performed in successive operations.

It will be understood that the skin tone layer 14 may instead be in the form of a temporary tattoo patch that is applied over a base layer 12 consisting of paint. With this combination, the layers may include the customized template with the imprinted grid or separate grid sheet to allow the individual to create a template that is larger or only slightly larger than the previous layer (s). Alternatively, the skin tone layer 14 may consist of a paint layer that is applied over a neutralizer layer 12, which consists of a patch. With this combination, the skin tone layer 14 is preferably applied so that it overlaps onto the individual's skin to provide a blending, which yields a more natural look. Alternatively, instead of using a paint for either layer, a paste may be substituted.

In this embodiment, a reintroduction layer 30 in the form of a temporary tattoo paint may also need to be utilized to re-introduce pigment onto the dried white liquid neutralizer layer(s) 12 to aid in the blending process such that the skin tone layer 14 properly matches the individual's skin tone. This temporary tattoo paint may be opaque and/or translucent. The application of the liquid temporary tattoo paint may be applied by utilizing, but not limited to, any of the following methods; roller, sponge, dauber, brush, Blo-pen™, blotter, sprayed on by means of the following: air brush, pump spray, aerosol or other suitable methods. This reintroduction layer 30 may be offered in varying skin tone(s) and/or pigments. It will be understood that the reintroduction layer 30 may consist of either a paint or a patch that is applied over the base layer 12. Further, multiple reintroduction layers 30 may be utilized as required. Moreover, the base layer 12 and the skin tone layer 14 can be either a patch, a paint or a paste respectively. The layers may include a customized template, as discussed above.

In accordance with another embodiment, the temporary liquid tattoo paint can be applied by utilizing an outer housing with an inner cartridge containing a colored liquid. Such a housing/cartridge configuration may be similar to that found in a BloPen® which is commercially available from P & M Products USA, Inc. of Lionville, Pa. The inner cartridge can be either a neutralizer base or a color intended to match the skin color of an individual. The inner cartridge can be replaced and changed such that the outer housing can be used with a variety of different colored liquids. The individual would then configure the inner cartridge appropriately such that an individual could blow through one end of the outer housing to expel paint from the inner cartridge onto an individual's skin. In addition to skin tone colors, a variety of other colors, such as red, orange, blue, yellow, etc. may be utilized as the top layer as desired. Obviously, other configurations may be utilized.

Any of the above processes may be used in conjunction with one another, i.e. temporary liquid tattoo paint with temporary tattoo patch and/or temporary tattoo patch with temporary liquid tattoo paint. In addition any of these above mentioned methods can be combined to simplify the application process and offer the individual a possible one step choice, in a selection of varying sizes and color tone(s) and/or pigment(s).

Figure 4:
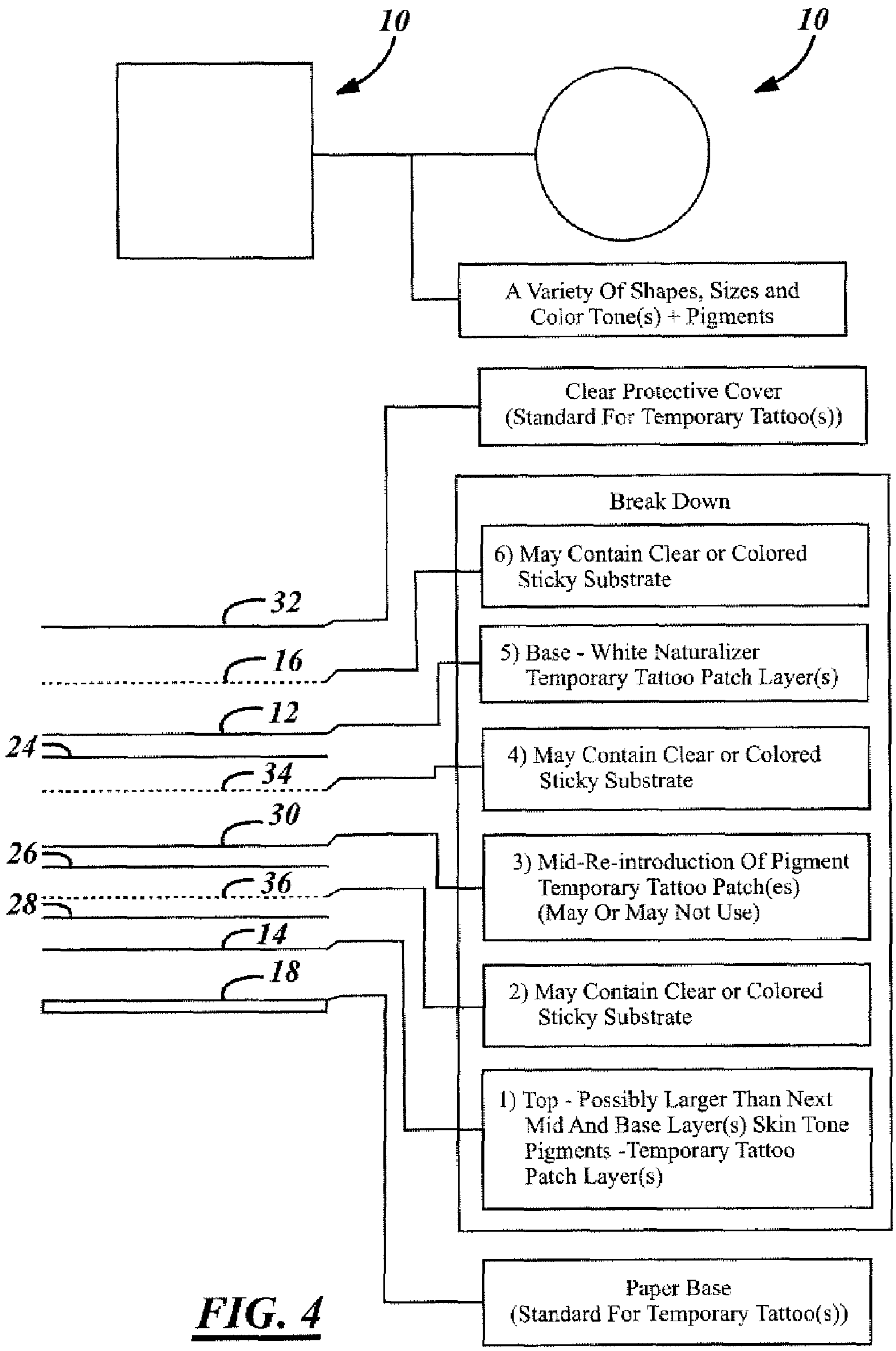
FIG. 4 is an example of a temporary tattoo patch in accordance with one embodiment of the present invention.

FIG. 4 illustrates an example of an embodiment of a temporary tattoo in accordance with the present invention where the layers consist of patches. The temporary tattoo may have a variety of shapes, sizes, color tones and pigments. As shown, where the layers consist of patches, the temporary tattoo 10 includes a clear protective cover 32 with a base-white neutralizer layer 12 thereon. The clear protective covers protect the temporary tattoo 10 from damage. A clear or colored sticky substrate 16 may also be disposed beneath the base-white neutralizer layer 34 to allow attachment of the base-white neutralizer layer 12 to an individual's skin. The tattoo 10 may also include a reintroduction of pigment temporary layer 30 disposed above the base-white neutralizer layer 12. A clear or colored sticky substrate 34 may also be disposed beneath the mid-re-introduction of pigment temporary layer to allow it to be adhered to the base-white neutralizer layer 12. Multiple reintroduction layers 30 may be utilized as desired. The tattoo 10 also includes a skin tone pigment layer 14 disposed above the reintroduction of pigment layer 30. A clear or colored sticky substrate 36 may also be disposed beneath the top skin tone pigment layer 14 to allow it to adhere to the layer 30. A paper base 12 is preferably disposed on top of the skin tone layer 14. In this embodiment, each layer includes a grid 24, 26 and 28 to assist in properly sizing each layer.

In sum, the temporary tattoo includes one or more temporary tattoo layers consisting of a white opaque neutralizer patches and/or a temporary tattoo paint consisting of white (opaque) which will block/neutralize the color beneath, i.e. skin imperfections, tattoo's, etc. These may optionally include a colored sticky substrate rather than clear in any and/or all layer(s) of the temporary tattoo patch. The temporary tattoo also includes one or more layers (either solid and/or liquid) of varying opaque and/or translucent skin pigments. To re-introduce pigment onto the skin, if necessary, a temporary tattoo patch and/or tattoo paint can be applied on top of the white neutralizer base 12 to re-introduce pigment allowing colors to blend in with a variety of skin tones. These may also optionally include colored sticky substrate rather than clear, in any and/or all layer(s), of the temporary tattoo patch. The temporary tattoo also includes one or more top layers of varying of opaque and/or translucent skin pigments (either solid and/or liquid). The package may or may not include several selections in each skin category by color or ethnicity (i.e. lightest pigments may contain 3 or more color choices, medium skin tones may contain 3 or more color choices, and dark pigments may contain 3 or more color choices). These may also optionally include colored sticky substrate rather than clear, in any and/or all layer(s) in the tattoo patch application.

The temporary tattoo may be provided in a kit that may contain a clear thin plastic sheet that is used typically as the protective covering of a temporary tattoo patch with imprinted grid(s) and/or a separate grid sheet(s), on transparent and/or solid paper. This will be used to customize the individual's permanent tattoo and/or skin imperfection-needing coverage. This transparent and/or solid paper grid sheet may have a separate sticky or tacky adhesive appropriate for skin usage to be applied following the cutting the grid sheet accordingly. It may also include a pen appropriate for use in marking on the grid. The kit may additionally include a sample strip of the above-mentioned, temporary tattoo layer of varying skin pigments (liquid and/or solid), to allow the individual to closely match their skin tone. (Example: The temporary tattoo patch will have a selection in a variety of colors and may include the first step of the white opaque neutralizer layer. The individual may either hold the sample up to their skin to find a tone that closely matches the area needing to be covered and or may apply the sample closest in color to, or even on the area needing coverage.) These samples may be in the form of ½ inch wide (more or less) by several inches in length (more or less). This application may include any combination of the above (solid and/or liquid) in any formulation to achieve the ultimate results.

This application may include in conjunction and/or alone (solid and/or liquid) a one process Pre-Assembled product. The product may be offered in a variety of skin tones and/or pigments and a variety of sizes. The top layer(s) may overlap the base and if needed mid-layer(s). In the case of a pre-assembled product, each color layer may contain a sticky substrate layer (clear and/or colored) for maximum results. This may include an alcohol wipe. This may include a dusting/finishing powder. This powder may or may not be colored.

The kit may include any of the following alone or in conjunction as a source of application: a liquid temporary tattoo paint may be applied by utilizing, but not limited to, any of the following methods; roller, sponge, brush, Blo-pen™, blotter, sprayed on by means of the following: air brush, pump spray, or aerosol etc. or other suitable application methods.

Yet another application for the present invention involves funeral homes. The present temporary tattoo can be used to cover dark portions of a deceased's skin as is known to occur, if the deceased got into an accident, is elderly, or has begun to decompose. Typically, caretakers of these deceased people have to take extremely heavy make-up to cover these dark problems. The problem is that when someone comes in to do the hair of a deceased, the caretaker has to dress this person, or even if a loved one touches this deceased person, the make-up can easily smear. The smearing thus reveals the terrible dark skin conditions below. In this application, the neutralizer, which is the first portion applied, is applied to the deceased's skin. Thereafter, the color selection closest to the person's own natural skin tone is added to the top. Additionally, a re-introduction of pigment layer may also be applied between the base layer and the color layer. These layers are all preferably applied by an aerosol or spray concept. It will be understood that a variety of colors can be offered in addition for lips, shadow, blush, etc.

Having now fully described the invention, it will be apparent to one of ordinary skill in the art that many changes and modifications can be made thereto without departing from the spirit or scope of the invention as set forth herein.

What is claimed is:

1. A temporary tattoo for application to an individual's skin for hiding or concealing skin markings, comprising:

a base layer consisting of an opaque neutralizer base that prevents read through of the skin markings;

a base layer sticky substrate in communication with and disposed beneath said base layer to assist in adhering said base layer to the individual's skin;

at least one pigmented layer disposed over said base layer and having a color and tone intended to match a color and tone of the individual's skin;

a pigmented sticky substrate in communication with and disposed beneath said at least one pigmented layer to assist in adhering said at least one pigmented layer to the individual's skin;

a reintroduction pigment layer disposed between said base layer and said at least one pigmented layer to assist in matching the color and tone of the individual's skin tone; and a reintroduction pigment layer sticky substrate in communication with said reintroduction pigment layer to assist in adhering said reintroduction pigment layer to the individual's skin.

2. The temporary tattoo of claim 1, wherein said at least one pigmented layer is sized larger than said base layer to overlie said base layer and blend more naturally with the individual's skin.

3. The temporary tattoo of claim 1, wherein said base layer, said reintroduction pigment layer, and said pigmented layer consist of an integral unit to be applied to the individual's skin.

4. The temporary tattoo of claim 1, wherein said opaque neutralizer base is colored white.

5. The temporary tattoo of claim 1, wherein said opaque neutralizer base is colored off white.

6. The temporary tattoo of claim 5, wherein said opaque neutralizer base is colored cream.

7. The temporary tattoo of claim 5, wherein said opaque neutralizer base is colored taupe.

8. The temporary tattoo of claim 1, wherein said base layer is a paint to be applied to the individual's skin.

9. The temporary tattoo of claim 1, wherein said base layer is a paste to be applied to the individual's skin.

10. The temporary tattoo of claim 1, wherein said base layer is a patch to be applied to the individual's skin.

11. A temporary tattoo for application to an individual's skin to cover skin markings, comprising:

a base layer consisting of an opaque neutralizer base;

a first substrate in communication with said base layer to assist in adhering said base layer to the individual's skin, at least one pigmented layer disposed over said base layer and having a color and tone intended to match a color and tone of the individual's skin;

a second substrate in communication with said at least one pigmented layer to assist in adhering said at least one pigmented layer to the individual's skin;

wherein the color of said opaque neutralizer base is selected from one of the following: white, cream or taupe;

a reintroduction pigment layer disposed between said base layer and said at least one pigmented layer to assist in matching the color and tone of the individual's skin; and a third substrate in communication with said reintroduction pigment layer to assist in adhering said reintroduction pigment layer to the individual's skin.

12. The temporary tattoo of claim 11, wherein said base layer and said at least one pigmented layer consist of a unitary structure.

13. The temporary tattoo of claim 11, wherein said base layer consists of a paint.

14. The temporary tattoo of claim 11, wherein said base layer consists of a patch

15. The temporary tattoo of claim 11, wherein said base layer consists of a paste.

16. The temporary tattoo of claim 11, wherein said at least one pigmented layer is waterproof.

* * * * *